May 12, 1970          J. ALTER          3,510,911
APPARATUS FOR ROTATIONAL MOLDING OF THERMOPLASTIC ARTICLES
Filed April 11, 1968
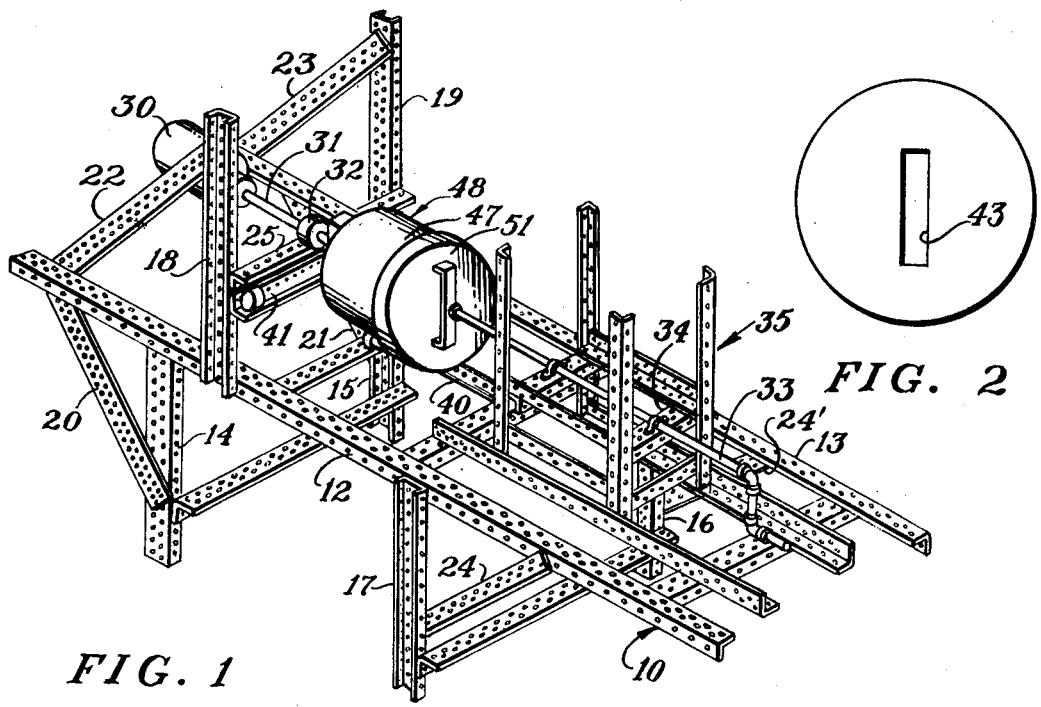
FIG. 1
FIG. 2
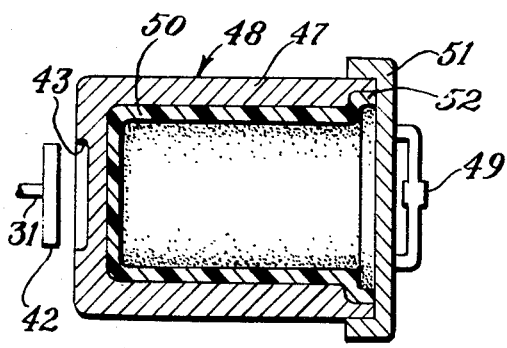
FIG. 4
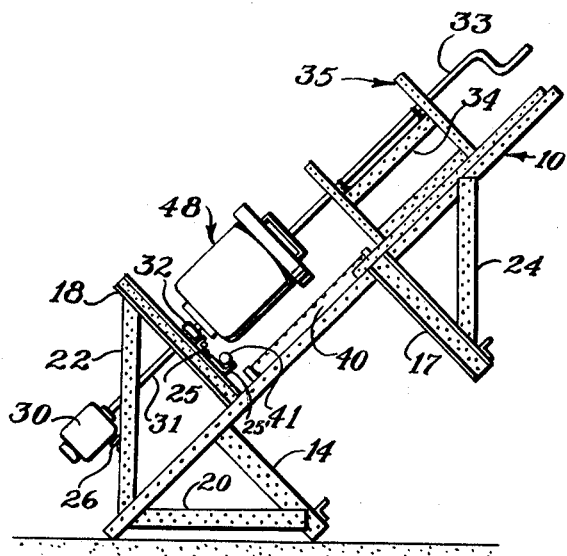
FIG. 3
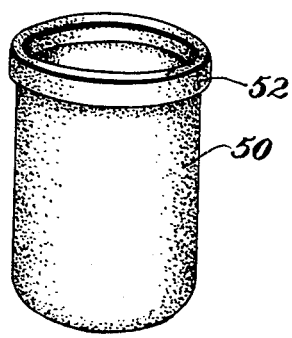
FIG. 5
INVENTOR.
JERRY ALTER
BY Leonard H. King
ATTORNEY United States Patent Office 3,510,911
Patented May 12, 1970

3,510,911
APPARATUS FOR ROTATIONAL MOLDING OF
THERMOPLASTIC ARTICLES
Jerry Alter, 1511 Sherwood Drive,
East Meadow, N.Y. 11554
Filed Apr. 11, 1968, Ser. No. 720,635
Int. Cl. B29g 7/00
U.S. Cl. 18—26                    3 Claims

ABSTRACT OF THE DISCLOSURE

An apparatus is provided for rotational molding of thermoplastic articles. The apparatus is simple and inexpensive and is capable of ready adjustment to accommodate a range of sizes.

This invention relates to rotational molding and in particular to an apparatus for rotational molding of thermoplastic articles.

BACKGROUND OF THE INVENTION

Rotational molding of thermoplastic material is a well known art. However, machines used for this purpose have generally been expensive and suited solely for the production of long runs. A need exists for an inexpensive method of producing short runs of large, rotationally molded articles. The apparatus described hereinafter satisfies these requirements.

Accordingly, it is an object of this invention to provide a low cost apparatus for rotational molding of large articles.

An object of this invention is to provide an apparatus readily adjustable for rotational molding of articles of diverse shape and size.

It is another object of this invention to provide a low cost mold suited for rotational molding of thermoplastic articles.

Still a further object of this invention is to provide an apparatus for rotational molding of large articles requiring a minimum of apparatus and personnel.

These and other features, objects and advantages of the invention will, in part, be pointed out with particularity and will, in part, become obvious from the following more detailed description of the invention taken in conjunction with the accompanying drawing which forms an integral part thereof.

BRIEF DESCRIPTION OF THE DRAWING

In the various figures of the drawing, like reference characters designate like parts.

FIG. 1 is a pictorial view of an apparatus of this invention;

FIG. 2 is an end elevational view of a typical mold member that may be used with the present invention;

FIG. 3 is a side elevational view of the structure of FIG. 1 but shown in an alternative position;

FIG. 4 is a cross sectional view of the mold member shown in FIG. 2; and

FIG. 5 is a pictorial view of a molded article made by the apparatus of this invention.

DESCRIPTION OF THE PREFERRED EMBODIMENT

The design of the apparatus is such that it may be readily constructed of perforated angle iron members. This permits ready adjustment of the apparatus to accommodate molds of different sizes.

As shown in FIG. 1, frame member 10 is comprised of a pair of horizontal stringers 12 and 13 and leg members 14, 15, 16 and 17. The vertical members 18 and 19 are normally fixed in position and angle members 20, 21, 22, 23, 24 and 24' provide support. Cross members 25 and 26 carry a motor 30 and support shaft 31 through bearing 32. A second support shaft 33 is carried by frame 34. The assembly, indicated generally by reference numeral 35, carrying frame 34 may be moved back and forth in the longitudinal direction. Frame 34 may be moved up and down and in the vertical direction and clamped at any desired point.

One end of shaft 31 is fitted with a bar 42 which fits into a slot 43 of mold form 48. The end of shaft 33 is threaded and is received in a threaded bore 49, which is part of a cover for mold member 48. Thus the mold 48 is clamped between shaft 31 and 33. The mold 48, as can be seen in FIG. 4, consists of a base member 47 and a cover 51. Perforated pipe members 40 and 41 serve as gas burners served from a gas supply. The burners may likewise be appropriately positioned.

After the apparatus has been adjusted to receive a particular mold, the mold is loaded with granular chips of a thermoplastic resin such as polyethylene resin. The mold is locked in place and the apparatus is then pivoted back at a 45° angle, as shown in FIG. 3. The burners are ignited so as to heat the mold in the position shown. As the resin melts, it coats the bottom of the mold and is permitted to operate in this position for a sufficient time to coat the mold. The time is function of the amount of resin used, the size and shape of the mold, and the heat intensity. The necessary time may be readily determined by experiment. After bottom has been coated, the apparatus is returned to its horizontal position and operated in that position until the side walls are coated. After a suitable time, which is readily determinable by even inexperienced operators, the mold is removed from the machine and opened and after cooking, the molded unit is removed. The finished product is shown in FIG. 5. The plastic shell 50 is provided with a lip 52.

Thus it will be appreciated that an inexpensive apparatus has been provided which is versatile and capable of molding relatively large articles.

The mold for this purpose can be a very inexpensive type and may be formed of a simple sheet metal form or cast iron form. If there is an undercut it shall be within the scope of the material to be flexed sufficiently to be removed from the mold.

There has been disclosed heretofore the best embodiment of the invention presently contemplated and it is to be understood that various changes and modifications may be made by those skilled in the art without departing from the spirit of the invention.

What I claim as new and desire to secure by Letters Patent is:

1. Support means for rotational molding apparatus, said support means comprising:
   (a) at least two laterally spaced, elongated stringers;
   (b) frame means for locating the molding apparatus on said stringer intermediate the ends thereof; and
   (c) a plurality of depending leg members each having an end secured to one of said stringers, the ends of said leg members opposite said stringers being in a first common plane to define means for supporting the rotational molding apparatus in a first position, the end opposite said stringers of two of said leg members and one end of each of said stringers being in a second common plane to define means for supporting the rotational molding apparatus in a second position that is at an angle to said first position.

2. The support means in accordance with claim 1 wherein said leg members are secured to said stringer at a distance from the end of said stringers that is at least as great as the length of said leg members.

3. The support means in accordance with claim 1 wherein said stringers and said frame means are perforated metal members.

References Cited

UNITED STATES PATENTS

| | | |
|---|---|---|
| 1,317,120 | 9/1919 | Wolever. |
| 2,369,520 | 2/1945 | Barnes. |
| 3,315,314 | 4/1967 | Barnett et al. |
| 3,382,541 | 5/1968 | Campbell. |

WILLIAM J. STEPHENSON, Primary Examiner